United States Patent [19]
Rachor et al.

[11] 3,912,798
[45] Oct. 14, 1975

[54] PROCESS FOR PRODUCTION OF FUEL BODIES, FUEL ELEMENTS AND ABSORBER ELEMENTS FOR HIGH TEMPERATURE REACTORS

[75] Inventors: Lothar Rachor, Kleinauheim; Gerhard Spener, Hanau, both of Germany

[73] Assignee: Hochtemperaturreaktor-Brennelement GmbH, Germany

[22] Filed: Sept. 18, 1973

[21] Appl. No.: 398,435

[30] Foreign Application Priority Data
Sept. 20, 1972 Germany............................ 2246163

[52] U.S. Cl................. 264/.5; 176/71; 252/301.1 R
[51] Int. Cl............................................. G21c 21/02
[58] Field of Search .............. 264/.5, 109, 111, 120; 425/405 H; 176/71, 88–92; 252/301.1 R

[56] References Cited
UNITED STATES PATENTS

| | | | |
|---|---|---|---|
| 2,888,715 | 6/1959 | Frank.............................. | 264/120 X |
| 2,996,763 | 8/1961 | Wentarf, Jr............................ | 264/.5 |
| 3,031,389 | 4/1962 | Goeddel et al. ................... | 264/.5 X |
| 3,042,594 | 7/1962 | Richland............................ | 264/.5 X |
| 3,158,547 | 11/1964 | Smith................................. | 264/.5 X |
| 3,255,278 | 6/1966 | Smith............................. | 264/120 X |
| 3,499,066 | 3/1970 | Murray...................... | 425/405 H X |
| 3,502,755 | 3/1970 | Murray...................... | 425/405 H X |

*Primary Examiner*—Benjamin A. Borchelt
*Assistant Examiner*—Harold Tudor
*Attorney, Agent, or Firm*—Cushman, Darby & Cushman

[57] ABSTRACT

Fuel bodies, fuel elements and absorber elements for high temperature reactors are produced by isostatic pressing of a mixture of binder containing a graphite powder and encased coated fuel particles and/or absorber particles at high compression ratios wherein the pressing process is carried out in a plurality of pressing steps with stepwise increasing compression so that in each pressing step a fixed compression takes place which is so selected that there is not required a specific vacuum step or deaeration step in the powdery condition and the air compressed in the pressing process can escape from the porous pressed article without injuring the structure and that a higher pressure is employed from pressing step to pressing step until the final compression and that in a first pressing step there is preformed in a rubber mold with a suitable cavity at low pressure kernels of the pressed article from a homogeneous mixture of encased, coated fuel particles and/or absorber particles and binder containing graphite molding powder and this preformed kernels embedded in a coating of binder containing graphite molding powder in a second pressing step in a second rubber mold with a suitable cavity are prepressed at low pressure, and in a third pressing step this preformed article is finally pressed at high pressure in a further rubber mold having a suitable cavity.

8 Claims, No Drawings

PROCESS FOR PRODUCTION OF FUEL BODIES, FUEL ELEMENTS AND ABSORBER ELEMENTS FOR HIGH TEMPERATURE REACTORS

For the insertion of fissile and fertile fuel materials and the neutron absorption materials used as combustible poisons in high temperature reactors it has been approved to provide these materials in the form of uranium and/or thorium carbide or oxide particles with gas tight coatings of pyrolytic carbon and silicon carbide and to press them embedded in a binder containing graphite mass to molded bodies. These pressed molded bodies are heat treated at about 2000 °C and then have similar properties to the artificial graphite produced by customary technology and used as the moderator or reflector.

Processes have been proposed for the production of spherical high temperature reactor fuel elements consisting of a particle containing nucleus and a fuel free shell in which first the lower half of the fuel free shell is formed in a metallic pressing tool, then the spherical nucleus is molded and finally the upper half of the shell is formed thereon by pressure, cylindrical fuel bodies are produced from homogeneous fuel particle-graphite mixtures in steel molding dies. After the heat treatment these fuel bodies present as full or empty cylinders serve as fuel inserts which are filled into the bore-holes of the rod or block shaped graphite fuel elements.

This working process in steel tools shows a preferential orientation of the graphite matrix of the pressed bodies in relation to the pressing axis. The resulting anisotropy of the matrix properties leads to a reduced resistance to radiation. Besides it does not exclude the individual coatings of the fuel particles from becoming damaged by the steel pressing tool.

Both disadvantages are avoided if in place of die molding process in steel pressing tools there is used the quasiisostatic pressing process in which the compression takes place in a rubber mold.

The cylindrical rubber mold is composed of several parts. It has in its center a hollow which is filled with the graphite pressing powder — fuel particle mixture. The filled rubber mold then is compressed in a cylindrical steel die with upper and lower punches. The pressed body formed in the rubber mold is heat treated. In this manner, there can be produced spherical fuel elements and cylindrical fuel inserts or absorbic elements with absorber particles, which have isotropic matrix properties and in which there is excluded the occurrence of damaged particles.

In the production of these pressed bodies in large numbers for high temperature powder reactors there is the disadvantage in pressing in rubber molds that the rubber forms subjected to the full molding pressure of 2–5 metric tons/cm² have only a limited life. Limiting the life on the one hand produces the wear of the rubber form having high stresses placed on it by the wearing out and changing in shape at the edges at which the individual parts necessary for filling and implying meet, on the other hand gradual changes in shape of the hollowed out portion of the rubber mold having high stresses placed on it. The cause of the wear in the contamination of the joining edges by graphite dust in the filling and emptying of the mold. Even if there are used extremely volume and shape stable silicone type rubbers (dimethyl silicone polymers), the highly stressed shapes only have a stability for 200 to 500 pressings where high demands are placed on the dimensional accuracy of the molded bodies. For the production of large numbers of articles, therefore, the repair or new production of molding shapes presents a definite cost factor.

Furthermore there is joined to the pressing according to these procedures of the pressing process a time consuming deaeration or vacuum step, since it is not possible to compress the loose molding powder to a practically impermeable finally compressed molded object in one step without removing the greatest part of the air contained in the powder. Without this deaeration, which according to the size of the molding material requires 1 to 2 minutes, it is not possible with the binder containing molding powders to obtain crack free molded bodies of high density which also do not become swollen or cracked in the subsequent temperature treatment at the customary speeds of heating.

An object of the invention is the development of a process in which the molding process is of the type in which the individual molding steps are distributed between stepwise increasing compression in which there takes place in each pressing step a fixed compression which is so chosen that a specific vacuum step or deaerification step in the powder condition is not required and the air compressed in the molding process can escape from the porous molded article without damaging the structure, and that an increasing pressure is used in each successive pressing step up to the final compression, and that in a first pressing step there are preformed in a rubber mold with a suitable cavity at low pressure kernels of the pressed article from a mixture of encased, coated fuel particles and/or absorber particles and binder containing graphite molding powder and the thus preformed kernels are embedded in a coating of binder containing graphite molding powder in a second pressing step in a second rubber mold with a suitable cavity and prepressed at low pressure, and in a third pressing step this preformed article is finally pressed at high pressure in a further rubber mold having a suitable cavity.

As absorbers there can be used compounds of conventional neutron absorbers such as boron carbide, hafnium carbide, gadolinium oxide, samarium oxide.

The pressure in the first pressing step can be from 5 to 100 kgf/cm², in the second pressing step 20 to 300 kgf/cm² and in the third pressing step 1000 to 5000 kgf/cm², preferably 1500 to 3000 kgf/cm².

The molding process in which the last shaping takes place and in which the high molding pressure is used is divided into two pressing steps in carrying out the process of the invention.

1. Preliminary pressing step for shaping the molded body in a rubber form at low molding pressure whereby there is formed in this step a body which is stable to handling but still porous, i.e., it permits the passage of air.

2. Final pressing step for the compression of the preformed molded body in a special rubber mold at full molding pressure.

This stepwise distribution of the pressing process produces a very good mold consistance for the rubber mold because in the preliminary molding step while large preforming displacements occur in the rubber, the strongly deformed preliminary mold need not endure any high pressure level and because while in the final pressing step a high pressure occurs the rubber is only slightly deformed. Besides the previously observed worn places on the high stressed rubber mold are avoided because the preliminarily pressed molded body forms no more graphite dust and the edges of the mold remain completely neat. Therefore both the lower stressed preliminary mold and the final mold, now last for several thousand molding processes. A further substantial advantage of the process of the invention is a considerable shortening of the cycle time in the presses since by the division of the pressing step into two steps there is eliminated the previously necessary time consuming deaeration or vacuum treatment of the mold filled with the graphite molding powder. In a given case instead of this at the beginning of the final pressing step in the rubber mold after placing the porous molding body and insertion of the rubber mold in the steel die and before the colliding of the molding punches the air pressure is reduced by evacuation. An evacuation time of only about 5 to 10 seconds is necessary.

Finally the requirements of exactness and mold constancy of the considerably smaller final pressing mold are less since the shaping takes place mostly in the intermediate step and the final pressing mold is applied to the preliminarily molded object without changing its shape.

This pressing process can be fully automatized for the producing of high number of articles. The process of the invention has the advantage that short time cycles are maintained and that the automatic pressing plants require only a considerably smaller supervision and maintenance since there can be produced an uniformly shape constant product over a substantially longer time.

Besides spherical fuel elements with particle free outer shells there can be produced according to the invention spherical absorber elements which in place of the coated fuel and fertile particles contain neutron absorber particles with or without pyrolytic carbon coating and which likewise have a particle free outer zone (shell). Besides cylindrical fuel inserts with homogeneous distribution of coated fuel and fertile particles in the graphite matrix with or without particle free outer zones can also be produced. In order to produce a good isotropy of the pressed graphite matrix the inner and outer measurements of the rubber mold are so formulated with relation to each other that the molding mixture is equally strongly compressed in the axial and radial directions and that all together an as exact as possible cylindrical body is formed with symmetrical shells. For the production of hollow cylinder shaped fuel inserts, which are protected on all sides by particle free outer zones, the preliminary mold is preferably filled zonewise with a special-filling apparatus and in one step the final body preliminarily pressed, which then can be pressed in the connected final pressing step according to the invention at high pressure to the final compression density.

If the fuel inserts should be directly exposed to the reactor cooling gas by inserting them into the cooling channels of the prismatic fuel elements there are preferably maintained on the outer jacket surface axially running clearance holding ribs in order to guarantee an equally broad cooling gas fissure around the fuel insert. These ribs are formed on or pressed by corresponding grooves in the wall of the preliminary mold and the final mold.

The procedure for the production of the different molded bodies is explained in more detail in the following examples.

Unless otherwise indicated all parts and percentages are by weight.

EXAMPLE 1

In order to produce a graphite molding powder nuclear clean natural graphite powder and graphitized petroleum coke having a particle size below 0.1 mm in the ratio 4:1 as well as 15% of a phenol-formaldehyde resin dissolved in methanol were mixed in a kneading mixer and then dried and ground. $(U,TH)O_2$-particles 0.4 mm in diameter which were coated with a 0.15 mm thick gas impermeable double layer of pyrolytic carbon were encased in one part of the thus produced binder containing graphite molding powder in a rotary drum according to a dragee' type coating process with addition of small amounts of solvent (e.g. methanol) until the coated particles had a porous encasing layer about 0.2 mm thick. These particles were dried and mixed portionwise with further graphite molding powder in the weight ratio 1:3.8.

A mixture portion of 135 grams which contained 20 grams of coated fuel particles were filled into the first rubber preliminary mold and this pressed in a steel die at about 15 kilograms force/cm² (15 kgf/cm²). At an axis ratio of 1:1.15 of the ellipsoidal shaped cavity of the rubber mold there is formed a minipulatable spherical molded article having a diameter of 6 cm and a molded density of about 1.2g/cm³. This molded article was embedded in a layer of loose graphite molding powder in a second rubber mold whose cavity had an axis ratio of 1:1.1. After pressing the mold to 150 kgf/cm² there was formed a manipulatable body having a diameter of about 72 mm and a weight of about 240 grams. This molded body was placed in the third rubber mold in which the preliminary pressed body fitted in exactly. The mold was then inserted in the high pressure molding die, evacuated in 6 seconds to 0.15 atm. and pressed at 2.5 metric tons/cm². The molded article was heated to 800°C to coke the binder and then annealed in vacuum at 1800°C. The sphere having a diameter of about 61 mm was lathed to exactly 60.0 mm. diameter. It now had a density of 1.8 g/cm³, a particle containing nucleus zone of about 50 mm diameter and a particle free shell about 5 mm thick.

Preferably the rubber molds are made of silicone rubber.

EXAMPLE 2

174 grams of encased, coated fuel particles produced as in Example 1 were mixed with 135 grams of the same graphite molding powder, filled into a rubber mold with a cylindrical cavity and preliminarily pressed at 13 kgf/cm² to a manipulatable molded body having a diameter of 6.5 cm and a height of 6.1 cm. This preliminarily molded body was embedded in a second rubber mold in a uniform layer of 150 grams of the same graphite molding powder and preliminarily molded at about 170 kgf/cm².

Subsequently the molded article thus obtained was final molded in a third rubber mold at full pressure of 2.5 metric tons/cm². After the subsequent heat treatment up to 1800°C it had a diameter of 67 mm, a height of 62 mm and a density of 2.0g/cm³, corresponding to a graphite matrix desnity of 1.75g/cm². The 130 grams of coated fuel particles contained in the nucleus of the cylinder occupied 30% of the volume of the nucleus.

What is claimed is:

1. A process for the production of fuel bodies, fuel elements and absorber elements for high temperature reactors comprising isostatic pressing of a mixture of binder containing graphite powder and encased coated member of the group consisting of the group consisting of fuel particles and absorber particles at high compression comprising pressing in a plurality of pressing steps with stepwise increasing compression so that in each pressing step a fixed compression takes place which is free of a vacuum or deaeration step when the material to be pressed is a powdery condition, permitting the air compressed in the pressing process to escape from the porous pressed article without injuring the structure and increasing the pressure employed in successive pressing steps until a final compression, said process including a first pressing step preforming in a rubber mold with a suitable cavity at low pressure, kernels of a homogeneous mixture of encased, coated particles selected from the group consisting of (1) fuel particles (2) absorber particles and (3) binder containing graphite molding powder and embedding said preformed kernels in a coating of binder containing graphite molding powder to form a preformed article by pressing in a second pressing step in a second rubber mold with a suitable cavity at low pressure a mixture of said kernels and binder containing graphite powder, and in a third pressing step, pressing said preformed article at high pressure in another rubber mold having a suitable cavity, and finally performing a subsequent heat treatment.

2. A process according to claim 1 wherein the cavity of each of the rubber molds is ellipsoidal and that the rubber molds are so dimensioned that there is formed after the subsequent separate heat treatment an exactly spherical body with a spherical nucleus and a uniform particle free shell, said process including the subsequent heat treatment.

3. A process according to claim 1 comprising selecting as the rubber mold for the first and second preliminary pressing steps molds having a cavity measurement so related to the outer measurement of the rubber mold that an exactly cylindrical molded body is formed by uniformly compressing the molded body in the axial and radial directions in the first preliminary pressing step and in the second preliminary pressing step pressing a uniform shell thereon so that all together there is formed a cylindrical body with symmetrical shells.

4. A process according to claim 3 comprising pressing on axially running space maintaining pieces in the second and third pressing step by providing corresponding grooves in the inner wall of the rubber mold.

5. A process according to claim 1 wherein the molds are made of silicone rubber.

6. A process according to claim 1 wherein the pressing in the secondary preliminary pressing step is at a pressure below 300 kgf/cm$^2$ and the pressing in the third molding step is at above 1000 kgf/cm$^2$.

7. A process according to claim 1 wherein the pressure in the second pressing step is at a pressure at least four times that in the first pressing step and the pressure in the third pressing step is at a pressure at least eight times that in the second pressing step.

8. A process according to claim 7 wherein the pressure in the second pressing step is at least five times that in the first pressing step and the pressure in the third pressing step is at a pressure at least 12 times that in the second pressing step.

* * * * *